March 28, 1961 G. H. PRIMEAU 2,977,139
SEAL
Filed Oct. 7, 1957

INVENTOR.
George H. Primeau
BY
J. C. Thorpe
ATTORNEY

United States Patent Office 2,977,139
Patented Mar. 28, 1961

2,977,139

SEAL

George H. Primeau, Grosse Pointe Farms, Mich., assignor to General Motors Corporation, Detroit, Mich., a corporation of Delaware Filed Oct. 7, 1957, Ser. No. 688,510

3 Claims. (Cl. 286—11.16)

This invention relates to new and useful improvements in seals and particularly to types of seals that are used between relatively rotatable parts.

The development of many of the hydraulically operated innovations on the newer automobiles, such as automatic transmissions, power steering, power brakes, etc., has also resulted in the development of new types of seals which are capable of being used under both static and dynamic conditions and which are relatively inexpensive to manufacture and easily and quickly installed. While such seals have proved of great practical value depending upon the dynamic conditions encountered, many of them are still not completely satisfactory for accomplishing the degree of sealing required.

The type of seals with which the present invention is primarily concerned usually comprises an intermediate portion having inner and outer axially extending flanges which are pressed into sealing engagement with the relatively rotatable members by means of garter springs or similar devices, the seal being carried by one member as the other member rotates relative thereto. It has been found in applications of the type of seal outlined above that in order to obtain the proper sealing effect and resist rotation of the seal on its supporting member, it is necessary to utilize relatively strong garter springs or else provide other more expensive methods of fastening.

A primary purpose of the present invention is to more effectively anchor one of the flanges of such a seal to one of the relatively movable parts and to enhance the sealing effect of the sealing juncture between the flange and the one of the parts without increasing the size of the parts or the cost thereof. The above desirable result is accomplished by the utilization of an unusual expansible type of retaining ring in combination with a novel configuration in cross-section of the seal. The retaining ring comprises at least two similar annular coils which are formed from a continuous winding so that the coils lie in adjacent radially extending parallel planes in intimate relation with each other. This type of ring thereby provides a substantial flat annular area at the periphery thereof which, when the retaining ring is properly constricted, expands so as to clamp one of the uniquely formed flanges of the seal securely to a supporting piece so as to prevent any rotation of the seal while at the same time enhancing the sealing effect.

For a further understanding of the invention and the objects thereof, reference may be made to the accompanying detailed description and drawings, in which.

Figure 1:
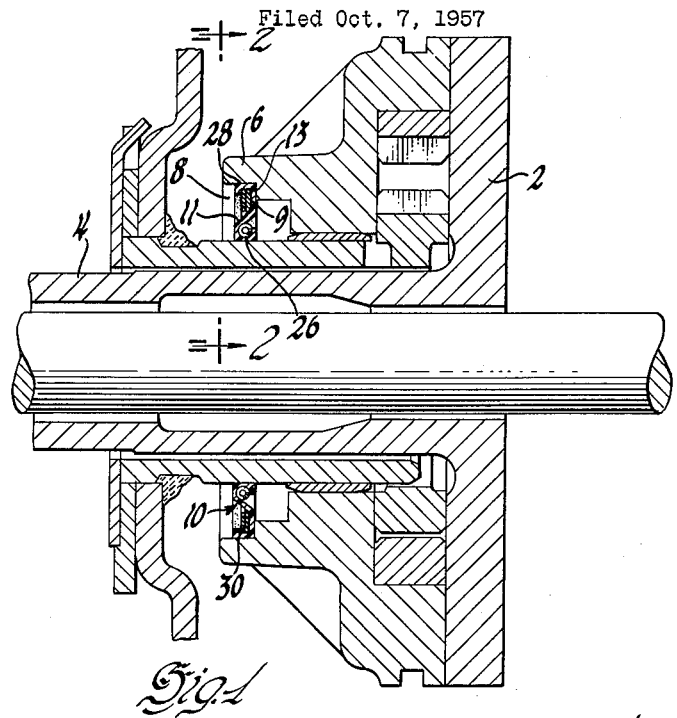
Fig. 1 is a view in elevation with parts in section of a portion of an automatic transmission having the unique seal between relatively rotatable parts thereof.
Figure 2:
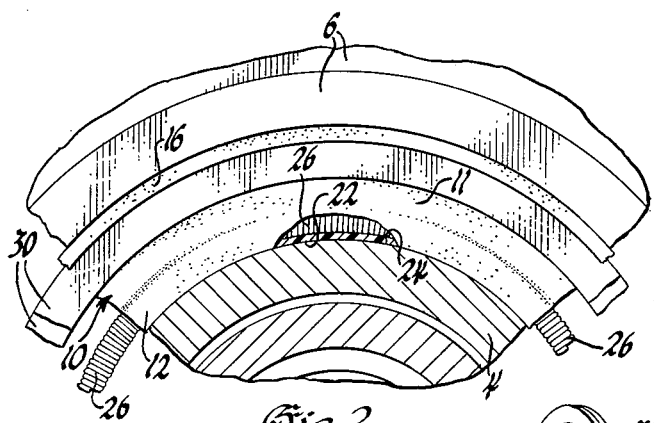
Fig. 2 is a view taken substantially on the line 2—2 of Fig. 1 with portions in section and broken away, further illustrating the unique seal and its relation to the parts which it is particularly adapted to seal.
Figure 3:
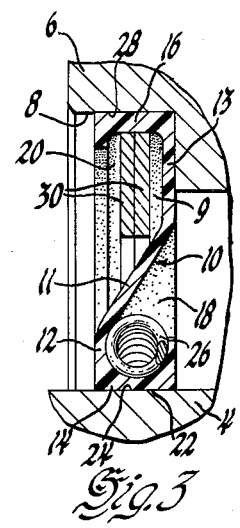
Fig. 3 is an enlarged fragmentary view of a portion of Fig. 1 showing in much greater detail the configuration of the seal and the unusual type of retaining ring used to clamp the seal to a supporting member.
Figure 4:
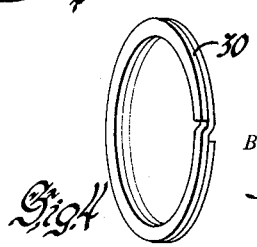
Fig. 4 is a view in perspective illustrating the details of the unusual retaining ring used in combination with the unique seal configuration.

Referring now to the drawing, by way of illustration of an application of the invention, a portion of an automotive automatic transmission is shown which includes relatively rotatable parts and for which the seal is particularly adapted. The relevant portions of the transmission for illustrating and describing the invention and its application include a stationary supporting portion 2 which has journaled therein for rotation with respect thereto a hollow shaft member 4. The portion 2 includes a necked-down cylindrical section 6 having an inner cylindrical portion 8 which in combination with the shaft 4 defines a seal cavity 9. The seal which is preferably made of polymerized tetrafluoroethylene is indicated generally by a numeral 10 and comprises and includes in cross-section a diagonally extending flat section 11 having radially inwardly and outwardly extending sections 12 and 13, respectively, on the ends thereof. The seal 10 also includes radially spaced inner and outer sealing flanges 14 and 16, respectively, extending axially in opposite directions from the radially inwardly and outwardly extending sections 12 and 13, respectively. It will be observed that the sections 11, 12, and 13 together with the flanges 14 and 16 form annular inner and outer spring cavities 18 and 20, respectively, which open axially in oppositely facing directions. The inner flange 14 of the seal 10 has an inner sealing surface 22 forming an inner cylindrical surface which is maintained in sealing engagement with the outer peripheral surface 24 of the hollow shaft member 4 by a garter spring 26. The inner flange 14 of seal 10 is formed on its outward side so that the circumference of the turns of the garter spring 26 fairs smoothly therewith and provides a wide evenly distributed sealing contact area between surfaces 22 and 24.

As previously mentioned herein during the earlier part of the specification, one of the difficulties encountered with seals of the type illustrated and described herein is that there is a tendency for the seal, unless properly anchored on one of the relatively rotating parts, to move relative to both of the relatively rotating parts. The present invention has been developed to overcome this difficulty by the unique configuration of the seal in combination with the anchoring retaining ring used to clamp the outer flange of the seal to an inner surface of the inner cylindrical portion 8. The ring for accomplishing this result and which is inserted in the spring cavity 20 is identified generally by the numeral 30. The ring 30 is formed of spring steel as a two-coil helix in true circular shape including an offset portion and is of a size that the ring 30 will expand in the spring cavity 20 so as to tightly clamp the flange 16 to the surface 28. It will be observed that the ring is plane-like in appearance so as to provide a substantial annular surface area engaging the flange 16. In this way a very substantial clamping effect is obtained which securely anchors the flange 16 to the surface 28 so as to prevent its rotation with respect thereto, while at the same time enhancing the sealing effect between surface 28 and flange 16 by reason of the substantial surface area contact between flange 16 and surface 28. Because of the winding action of the helical spring both of the rings thereof will always retain their circularity in action and will snugly fit their spring cavity throughout their entire contour thus assuring very even clamping action and even sealing.

I claim:

1. In combination with concentric relatively rotatable parts including an inner cylindrical shaft and an outer annular support having an inner cylindrical surface forming a seal cavity with said shaft, a seal in said cavity comprising an annular one-piece sealing element having an intermediate portion extending between said parts and radially spaced inner and outer sealing flanges extending axially in opposite directions from said intermediate portion and adjacent said shaft and cylindrical surface, respectively, an annular constrictive spring surrounding the inner of said flanges and retaining it in movable sealing engagement with said shaft, and a retaining ring within said outer flange having expansible radially extending flat and touching helical coils anchoring said outer flange to said inner surface whereby said springs are sealingly separated from each other.

2. In combination with concentric relatively rotatable parts including an inner cylindrical shaft and an outer annular support having an inner cylindrical surface forming a seal cavity with said shaft, a seal in said cavity comprising an annular one-piece sealing element having an intermediate portion extending diagonally between said parts and radially spaced inner and outer flanges extending axially in opposite directions from said intermediate portion and adjacent said shaft and cylindrical surface, respectively, an annular constrictive spring surrounding the inner of said flanges and retaining it in movable sealing engagement with said shaft, and an expansible retaining ring within said outer flange comprising two similar annular coils formed from a continuous winding, said coils lying in adjacent parallel radially extending planes in intimate relation and connected by an offset portion, the outer peripheries of said coils forming an essentially flat surface area clamping said outer flange to said inner cylindrical surface, and whereby said springs are sealingly separated from each other.

3. In combination with concentric rotatable parts including an inner cylindrical shaft and an outer annular support having an inner cylindrical surface forming a seal cavity with said shaft, a seal in said cavity comprising an annular one-piece sealing element having an intermediate portion, said intermediate portion in cross-section including a diagonally extending flat section having radially inwardly and outwardly extending sections on the ends thereof, radially spaced inner and outer sealing flanges extending axially in opposite directions from said radially inwardly and outwardly extending sections, respectively, said sections together with said flanges forming annular inner and outer spring cavities on opposite sides of said diagonal section and adjacent the inside of said outer flange and the outside of said inner flange, respectively, an annular constrictive spring in the inner of said spring cavities surrounding the inner of said flanges and retaining it in movable sealing engagement with said shaft, and an expansible retaining ring in the outer of said cavities comprising two similar annular coils formed from a continuous winding, said coils lying in adjacent radially extending parallel planes in intimate relation and connected by an offset portion, the outer peripheries of said coils forming an essentially flat surface area clamping said outer flange to said inner cylindrical surface, said springs being sealingly separated from each other by said diagonal section.

References Cited in the file of this patent
UNITED STATES PATENTS

| | | |
|---|---|---|
| 2,162,104 | Mosher | June 13, 1939 |
| 2,450,425 | Frisby | Oct. 5, 1948 |
| 2,566,448 | Heintz et al. | Sept. 4, 1951 |